May 24, 1949.

C. L. LEONARD 2,470,858

ANIMAL TRAP

Filed Sept. 25, 1944

INVENTOR.
CASWELL L. LEONARD

*J. H. Weatherford*
ATTY.

May 24, 1949.　　　　C. L. LEONARD　　　　2,470,858
ANIMAL TRAP
Filed Sept. 25, 1944　　　　　　　　　　　2 Sheets-Sheet 2
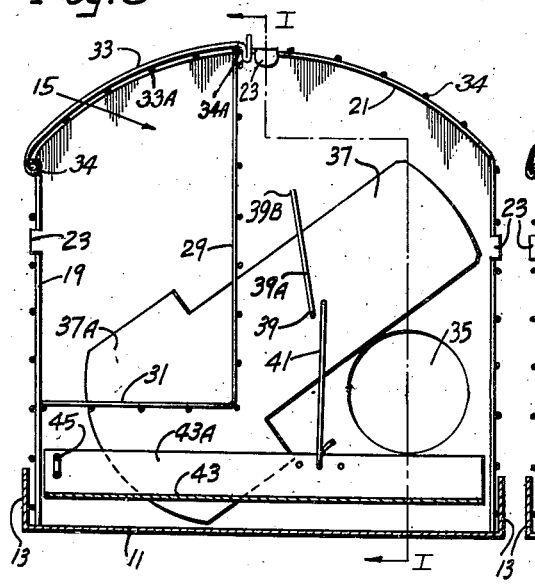
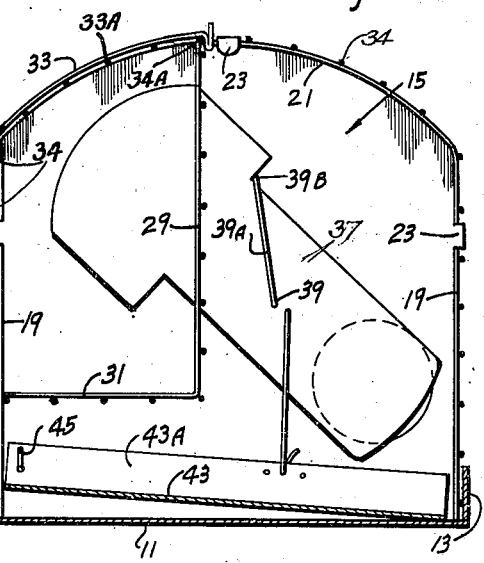
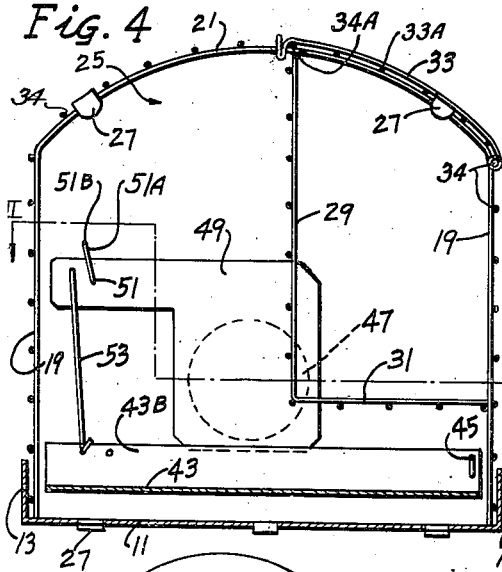
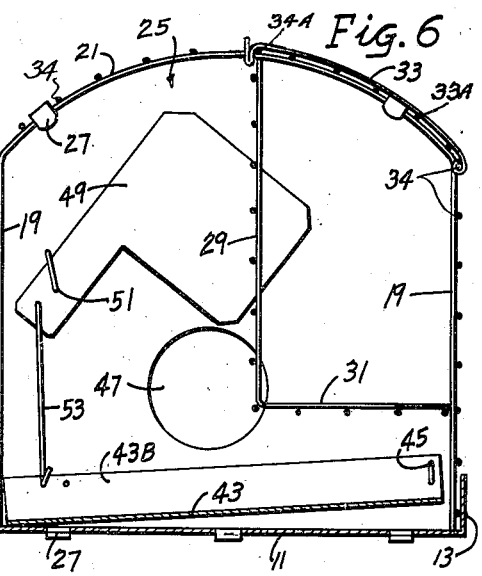
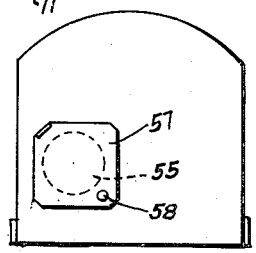
INVENTOR.
CASWELL L. LEONARD
BY
J. K. Weatherford
ATTY.

Patented May 24, 1949

2,470,858

UNITED STATES PATENT OFFICE 2,470,858

ANIMAL TRAP

Caswell L. Leonard, Memphis, Tenn., assignor of one-half to J. H. Kail, Memphis, Tenn.

Application September 25, 1944, Serial No. 555,677

2 Claims. (Cl. 43—67)

This invention relates to improvements in animal traps, and has particular reference to a trap for smaller animals, such as rats or other rodents.

The objects of the invention are:

To provide a trap which automatically resets itself after use;

To provide a trap in which several animals may be trapped in succession without resetting or other attention on the part of the trapper;

To provide a trap in which the bait is displayed without chance of the animal reaching and destroying it;

To provide a trap having compartments in a first of which the animal is trapped and in the other thereof it is retained while the trap is being used to catch additional animals;

To provide a trap which is of simple and efficient construction, is built of a minimum of parts and is extremely rugged.

In accomplishing these objects, the invention contemplates the provision of an entrance section into which the animal may enter in an endeavor to obtain access to the bait, and an auxiliary section which may conveniently be of larger size, the entrance to the trap section being normally open, and being closed by the entrance of the animal into and while it is within, such section; and in which such entrance and presence of the animal within the section establishes a fully open exit therefrom through which the animal may transfer to the auxiliary section in an endeavor to escape, exit of the animal from the first section allowing the automatic closure of the communicating opening between the sections, and reopening of the entrance to the trap section.

The means by which the foregoing and other objects are accomplished, and the manner of their accomplishment, will readily be understood from the following specification upon reference to the accompanying drawings, in which:

Fig. 3 is a sectional elevation on the line III—III of Fig. 1 looking in the direction of the arrows, with the entrance door open;

Fig. 4 is a concurrently taken sectional elevation on the line IV—IV of Fig. 1, the communicating door being then closed.

Figs. 5 and 6 are respectively sections as Figs. 3 and 4 taken on the same lines of Fig. 1, but Fig. 5 showing the entrance door closed and Fig. 6 showing the communicating door held open as by the presence of the animal in the trap; and Fig. 7 is an end elevation on a reduced scale showing a door for removal of animals from the trap.

Figure 2:
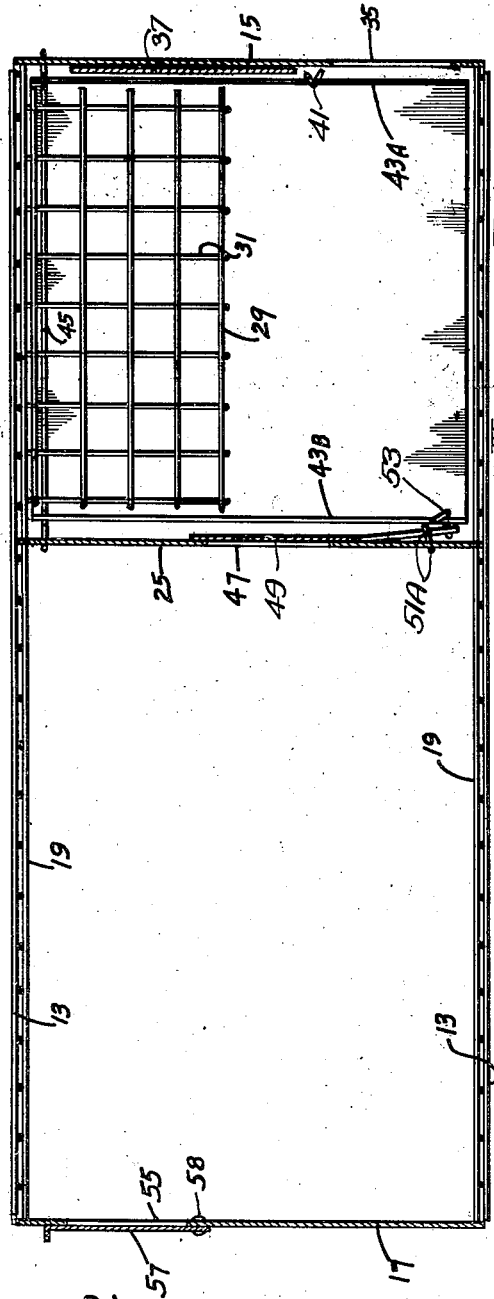
Fig. 2 is a sectional plan view taken on horizontal planes through the centers of the entrance and exit openings, and with the center wall and shutter in section on the line II—II of Fig. 4, the exit and center wall shutter being closed and the entrance shutter open.
Figure 1:
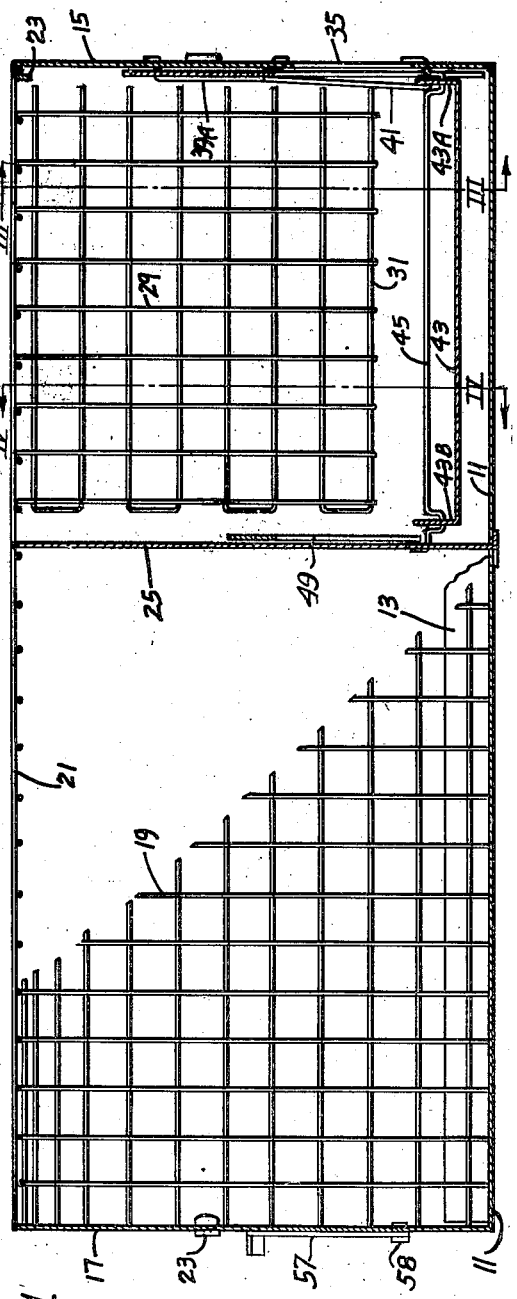
Fig. 1 is a longitudinal sectional view taken on the line I—I of Fig. 3, a fragmentary portion only of the side wall in the background being shown.

Referring now to the drawings in which the various parts are indicated by numerals:

The trap comprises a bottom 11, preferably a metal sheet, which extends from end to end of the trap, has upturned side flanges 13 also extending from end to end, and which sheet at its opposite ends is bent upward to respectively form a front or entrance end 15 for the trap and a rear end 17 therefor.

19 are side walls of wire mesh which are integrally connected by a top portion 21, here shown as arched, which forms the top of the trap, the side walls and top extending from end wall to end wall with the lower edges of the side walls in the channel formed by the side flanges 13, and being secured to the end walls by bent-over clip portions 23 integral with such end walls.

Lengthwise the trap is divided into a snare chamber and a cage by a transverse intermediate wall 25 which is preferably secured to the top and base by ears 27 integral with such intermediate wall, which ears extend through suitable holes in the bottom 11 and past the transverse wires of the top and are bent over. Within and along one side of the snare chamber is a longitudinally disposed vertical wall portion 29 and an integral horizontal wall portion 31 spaced above the bottom of the trap, these being of wire mesh, similar to that used for the sides of top of the trap, thus forming within the snare chamber a bait chamber or holder in which the bait to be used is deposited, and in which holder the bait is substantially inaccessible to the animal, though alluringly displayed.

Access to the bait chamber for placing bait therein may be had through a door, preferably of the same wire mesh as the trap, the door having cross wires 33 of the same arcuate curvature as the top and longitudinal wires 33A, and the door covering a suitable opening cut in the wire mesh of the top of the trap. The wires 33 are looped to hinge on one of the longitudinal wires 34 of the trap and at their opposite ends are bent to hook over and engage another 34A of such wires.

The entrance end 15 of the trap is provided with an opening 35 through which the animal enters the snare chamber and with a shutter 37 for closure of this opening, the shutter being mounted for swinging movement about a pivot 39 which extends from the wall 15 through the shutter. The pivot preferably has an upwardly extending loop portion 39A lying along the face of the shutter and forms with the end wall a guideway for the shutter for swinging movement.

The upper end of this loop portion is turned toward the wall and has a pin portion 39B anchoring it to the wall, this upper pin portion limiting swinging movement of the shutter in closing, as seen in Fig. 5. The end 37A of the shutter is weighted as by increase in width and length over the opposite end to accomplish opening movement of the shutter.

The shutter is connected through a link 41 to an underlying false bottom or platform 43 which extends from end to end of the snare chamber and from side to side thereof, the platform preferably having flanges 43A and 43B along its opposite edges and in respective proximity to the entrance end and intermediate wall of the trap, the link 41 being operatively connected to the flange 43A.

Adjacent one side of the trap a rod 45 is carried by and extends from the entrance wall 15 to the intermediate wall 25 and through the flanges 43A, 43B of the platform to form a hinge support for the platform adjacent such side.

The intermediate wall 25 is provided with an opening 47 through which the animal may transfer from the snare chamber to the cage. Cooperating with this opening is a shutter 49 which closes the opening as the entrance opening 35 is uncovered by the shutter 37. The shutter 49 is pivotally mounted on a pin 51 carried by the intermediate wall 25, this pin having a confining loop portion 51A which is connected at its upper end by an additional pin portion 51B into the wall 25.

The shutter 49 is connected by a link 53 to the flange 43B of the platform 43, depression of the platform moving this shutter to uncover the opening 47 as the same platform depression swings the shutter 37 to close the opening 35. The over-balancing weight of the shutter 37 and the weight of the shutter 49 cooperate and are made sufficient to hold the shutter 37 open, the shutter 49 closed and the platform 43 in raised position when the snare chamber is empty.

The end 17 of the cage section is provided with an opening 55 which is closed by a shutter 57 pivotally hinged as by a pin 58 to the end, and is manually shifted to remove animals from the trap.

It will be particularly noted that the hinge support for the platform underlies the bait chamber in such manner that the animal in the snare chamber cannot approach close enough to the hinge to allow the over-balancing weights of the shutters to raise the platform and allow uncovering of the entrance opening. Also because of the side hinging of the platform, approach to the shutter 49 similarly does not allow such re-opening of the entrance opening.

In use of the trap, bait of an alluring type and smell is placed in the bait holder and the trap disposed in known haunts of the animals to be trapped, the shutter to the entrance end of the snare chamber automatically uncovering the entrance opening to the snare chamber and the other shutter closing the exit from the snare chamber to the cage.

The animal is attracted by the bait to the trap and in an endeavor to obtain access to the bait eventually enters the trap through the opening in the entrance end wall. Once within the trap the weight of the animal depresses the platform and swings the shutter at the entrance end to close the entrance opening, and concurrently swings the shutter along the intermediate wall to open the exit opening from the snare chamber into the cage, and so long as the animal is within the snare chamber these conditions persist.

The trapped animal in an endeavor to escape from the snare chamber sooner or later passes through the exit opening in the intermediate wall and into the cage, removing its weight from the platform, allowing the over-balancing weight of the entrance shutter and the weight of the exit shutter to respectively reopen the entrance opening and close the exit opening, thus setting the trap for the snaring of additional animals.

The bait chamber walls having protected the bait against destruction, the bait remains as a lure and additional animals are attracted and trapped.

I claim:

1. An animal trap having end walls, and an intermediate wall forming snare and cage chambers, the end wall of said snare chamber and said intermediate wall having openings for respective entrance to and exit from said snare chamber, shutters mounted on said walls for respective cooperation with said openings and respectively biased open and shut, a platform within said snare chamber and below said openings, hinged along one side of said snare chamber, means in said snare chamber extending longitudinally of and spaced from the hinged side of said snare chamber to prevent approach of an animal within said snare chamber to the hinge edge of said platform, and links operatively coupling said platform to said shutters, said platform being responsive to the weight of an animal within said snare chamber, for effecting coordinated closure and opening of said shutters respectively against the bias thereof.

2. An animal trap comprising an enclosure having side and top walls of wire mesh, end walls and a bottom, a division wall segregating said enclosure into snare and cage chambers, the end wall of said snare chamber and said division wall having openings therethrough for respective entrance to and exit from said snare chamber, cooperating shutters pivotally mounted on said walls and weighted to urge said shutters to respective open and closed positions, a platform substantially co-extensive with said snare chamber hinged along one side of said snare chamber and underlying said openings, means coupling said platform to said shutters to effect respective closure of the one and opening of the other, responsive to the weight of an animal entering said snare chamber, and wall means of wire mesh along, and spaced from, said hinging side of said snare chamber and spaced above said platform to establish a bait chamber, said wall means extending from end to end of said snare chamber, and maintaining remoteness of said animal from said hinge side of said platform.

CASWELL L. LEONARD.

REFERENCES CITED

The following references are of record in the file of this patent:

UNITED STATES PATENTS

| Number | Name | Date |
| --- | --- | --- |
| 617,617 | Thornley | Jan. 10, 1899 |
| 1,349,453 | Hall | Aug. 10, 1920 |
| 2,229,685 | Swedenburg | Jan. 28, 1941 |
| 2,237,227 | Huggins | Apr. 1, 1941 |
| 2,332,334 | Morrisson | Oct. 19, 1943 |